(12) United States Patent
Reckzeh et al.

(10) Patent No.: US 10,807,732 B2
(45) Date of Patent: Oct. 20, 2020

(54) AIRCRAFT

(71) Applicants: Airbus Operations GmbH, Hamburg (DE); Airbus Operations S.L., Getafe (ES)

(72) Inventors: Daniel Reckzeh, Hamburg (DE); Raul Carlos Llamas Sandin, Getafe (ES)

(73) Assignees: AIRBUS OPERATIONS GMBH, Hamburg (DE); AIRBUS OPERATIONS S.L., Getafe (ES)

(*) Notice: Subject to any disclaimer, the term of this patent is extended or adjusted under 35 U.S.C. 154(b) by 168 days.

(21) Appl. No.: 15/807,857

(22) Filed: Nov. 9, 2017

(65) Prior Publication Data

US 2018/0134406 A1    May 17, 2018

(51) Int. Cl.
| | |
|---|---|
| *B64D 33/02* | (2006.01) |
| *B64C 5/02* | (2006.01) |
| *B64C 7/02* | (2006.01) |
| *B64D 27/26* | (2006.01) |
| *B64D 27/20* | (2006.01) |

(52) U.S. Cl.
CPC .............. *B64D 33/02* (2013.01); *B64C 5/02* (2013.01); *B64C 7/02* (2013.01); *B64D 27/20* (2013.01); *B64D 27/26* (2013.01); *B64D 2033/0226* (2013.01); *Y02T 50/40* (2013.01)

(58) Field of Classification Search
CPC ........ B64D 33/02; B64D 27/20; B64D 27/26; B64D 2033/0226; Y02T 50/44; B64C 5/02; B64C 7/02

See application file for complete search history.

(56) References Cited

U.S. PATENT DOCUMENTS

| | | | |
|---|---|---|---|
| 2,504,137 | A | 4/1950 | Lewis |
| 5,855,340 | A | 1/1999 | Bacon |
| 7,407,133 | B2 | 8/2008 | Bacon |
| 2008/0073459 | A1 | 3/2008 | Cazals et al. |
| 2012/0138736 | A1 | 6/2012 | Cazals et al. |

(Continued)

FOREIGN PATENT DOCUMENTS

| | | |
|---|---|---|
| DE | 1186338 | 1/1965 |
| FR | 2873096 | 1/2006 |

(Continued)

OTHER PUBLICATIONS

European Search Report, dated May 11, 2017, priority document.

*Primary Examiner* — Rodney A Bonnette
(74) *Attorney, Agent, or Firm* — Greer, Burns & Crain, Ltd.

(57) ABSTRACT

An aircraft comprising a fuselage extending along a longitudinal axis between a fore section and an aft section, wings mounted to the fuselage, a tail unit mounted to the aft section of the fuselage, and a first propulsion unit and a second propulsion unit both mounted to the aft section of the fuselage in such a way that a first axis of rotation of the first propulsion unit and a second axis of rotation of the second propulsion unit both extend in a vertical center plane spanned by the longitudinal axis and a yaw axis. The provided centerline mounted double-engine aircraft allows for a simple manufacture, maintenance and retrofit of the engines, in that the first propulsion unit and/or the second propulsion unit are arranged outside the fuselage.

22 Claims, 5 Drawing Sheets

(56) References Cited

U.S. PATENT DOCUMENTS

2014/0239117 A1\* 8/2014 Sommer ................ B64C 39/12
  244/48
2015/0291285 A1   10/2015 Gallet
2016/0214727 A1    7/2016 Hamel et al.
2018/0362171 A1\* 12/2018 Curchod ................ B64D 27/26
2019/0031363 A1\*  1/2019 Hoisington ............ B64D 35/02

FOREIGN PATENT DOCUMENTS

| FR | 2942773 | 9/2010 |
| FR | 2993859 | 1/2014 |
| FR | 2997681 | 5/2014 |

\* cited by examiner

AIRCRAFT

CROSS-REFERENCES TO RELATED APPLICATIONS

This application claims the benefit of the European patent application No. 16198762.3 filed on Nov. 14, 2016, the entire disclosures of which are incorporated herein by way of reference.

BACKGROUND OF THE INVENTION

The present invention relates to an aircraft, in particular to a centerline mounted multi-engine, preferably double-engine, aircraft, comprising a fuselage, wings, a tail unit, a first propulsion unit and a second propulsion unit.

The fuselage extends along a longitudinal axis of the aircraft between a fore section and an aft section. The wings are mounted to the fuselage between the fore section and the aft section. The tail unit is mounted to the aft section of the fuselage. The first propulsion unit and the second propulsion unit are both mounted to the aft section of the fuselage in such a way that a first axis of rotation of the first propulsion unit and a second axis of rotation of the second propulsion unit, both extend in a vertical center plane, in particular a vertical symmetry plane of the aircraft, spanned by the longitudinal axis and a yaw axis of the aircraft. The first propulsion unit and the second propulsion unit being mounted to the aft section of the fuselage does not necessarily mean that they are mounted directly to the fuselage. They might also be mounted to the fuselage by means of e.g., a pylon. The first propulsion unit and/or the second propulsion unit might be in the form of an entire jet engine including a propulsion generator in the form of a fan, a propeller or a rotor, as well as including a power generator in the form of a turbine unit including compressor, combustion chamber and turbine. However, the first propulsion unit and/or the second propulsion unit might also be in the form of merely the propulsion generator of the jet engine, while the power generator does not necessarily be formed together or arranged at the same place or in line with the propulsion generator. In any case, the first axis of rotation of the first propulsion unit and the second axis of rotation of the second propulsion unit relate to the axes of rotation of the propulsion generators, i.e., fan, propeller or rotor. Spatial terms used herein such as horizontal, vertical, upper or lower refer to a normal position of the aircraft on the ground.

Centerline mounted single engine aircraft are known from US 2015/0291285 A1 and triple engine aircraft with one centerline mounted engine are known from US 2016/0214727 A1. However, for licensing reasons and for efficiency reasons a centerline mounted double-engine aircraft would be preferred. Such centerline mounted double-engine aircraft are known from, e.g., U.S. Pat. No. 7,407,133 B2 and from U.S. Pat. No. 5,855,340. These aircraft, however, have two propulsion units in the form of jet engines both integrated in the fuselage structure, so that no direct access to the engines is possible.

SUMMARY OF THE INVENTION

For these reasons, an object of the present invention is to provide a centerline mounted double-engine aircraft that allows for a simple manufacture, maintenance and retrofit of the engines.

This object is achieved by the first propulsion unit and/or the second propulsion unit being arranged outside the fuselage. Preferably, both propulsion units are arranged outside the fuselage. This means, at least the rotating parts of the propulsion units, are arranged completely outside of the fuselage. The expression "outside of the fuselage" has to be understood as external to an outer skin of the fuselage limiting the interior of the fuselage to the outside.

By the first and second propulsion units being arranged outside the fuselage, simple and quick access to the propulsion units is possible, thereby simplifying maintenance, check, repair and installation of the propulsion units. Additionally, the room inside the fuselage can be used for other purposes, such as passenger or cargo accommodation. Further, the aircraft might be easily equipped with a different engine type or size without changing the fuselage geometry essentially, thereby improving modularity of the aircraft. Also, the structural damage to the fuselage in the case of uncontained engine rotor failure (UERF) is significantly reduced. Finally, also structural and aerodynamic advantages exist for the engines being arranged outside the fuselage.

According to a preferred embodiment, the first propulsion unit and the second propulsion unit are staggered along the longitudinal axis, preferably such that the first propulsion unit does not overlap with the second propulsion unit along the longitudinal axis. Preferably, no rotating parts of one of the first propulsion unit and the second propulsion unit overlap with the other one of the first propulsion unit and the second propulsion unit along the longitudinal axis. In such a way, in the case of uncontained engine rotor failure, the rotating parts of the failing engine cannot cause damage at the other, non-failing engine.

According to another preferred embodiment, the aft section of the fuselage has an aft end, wherein the first propulsion unit is mounted to the aft end of the fuselage. In such a way, in the case of an uncontained engine rotor failure, the damaged rotating part cannot cause any damage to the fuselage.

In particular, it is preferred that the first propulsion unit comprises a first nacelle. The aft section of the fuselage narrows to the aft end. The first propulsion unit is mounted to the aft end of the fuselage in such a way that a first intake is formed between the first nacelle and an aft fuselage skin section at the aft section of the fuselage. In such a way, Boundary Layer Ingestion (BLI) is enabled at the first propulsion unit.

It is further preferred that the first intake extends circumferentially, preferably over 360°, around the aft section of the fuselage, i.e., the first intake extends over the entire circumference of the aft section of the fuselage. In such a way, Boundary Layer Ingestion is enabled over the entire circumference of the aft section of the fuselage.

It is further preferred that the first propulsion unit, in particular the first intake, is configured for Boundary Layer Ingestion, preferably over 360° of the intake. The first propulsion unit being configured for Boundary Layer Ingestion means, in particular, that the inner duct, the compressor section, the combustion chamber, turbine section and the outlet duct, as well as any fan section are configured for Boundary Layer Ingestion. Boundary Layer Ingestion provides that the low energy boundary layer next to the skin surface is sucked into the engine, thereby allowing a reduction of the rotational speed of the engine, which in turn increases efficiency of the engine and reduces sound emission.

According to a preferred embodiment, the first propulsion unit is arranged in such a way that the first axis of rotation is essentially aligned with the longitudinal axis. In such a way, the first propulsion unit produces a central thrust.

In a further preferred embodiment, the second propulsion unit is arranged at, preferably mounted to, an upper side of the aft section of the fuselage, so that preferably the second axis of rotation is arranged further above than the first axis of rotation. In such a way, the second propulsion unit can be staggered with respect to the first propulsion unit and the second axis of rotation can be spaced from the first axis of rotation.

In particular, it is preferred that the second propulsion unit comprises a second nacelle. The second nacelle, at least in a lip portion, is interrupted along its circumference by an upper fuselage skin section at the aft section of the fuselage, such that a second intake is formed between the lip portion of the second nacelle and the upper fuselage skin section. In other words, the second intake is defined between a circumferential border formed by the lip portion of the second nacelle and the upper fuselage skin section. In such a way, also at the second propulsion unit, a certain amount of Boundary Layer Ingestion is enabled.

In particular, it is preferred that the circumferential section, in which the lip portion of the second nacelle is interrupted by the upper fuselage skin section, has an angular extension with respect to the second axis of rotation of the second propulsion unit, of between 5° and 180°, preferably between 10° and 120°, more preferred between 20° and 90°, most preferred between 30° and 60°. In such a way, a considerable amount of Boundary Layer Ingestion is enabled although the second propulsion unit is arranged outside the fuselage at an upper side of the aft section of the fuselage.

It is further preferred that the second propulsion unit, in particular the second intake, is configured for Boundary Layer Ingestion, at least in the region of the circumferential section in which the lip portion of the second nacelle is interrupted by the upper fuselage skin section. In such a way, the rotational speed of the second propulsion unit can be reduced, thereby increasing efficiency and reducing noise emission of the engine.

According to an alternative embodiment, the second propulsion unit comprises a second nacelle, wherein the second nacelle is arranged in such a way that at least a lip portion of the second nacelle is spaced apart from an upper fuselage skin section at the aft section of the fuselage, so that a gap is formed between the lip portion of the second nacelle and the upper fuselage skin section. In such a way, no Boundary Layer Ingestion is provided at the second propulsion unit, so that only the first propulsion unit needs to be configured for Boundary Layer Ingestion.

According to a preferred embodiment, the tail unit is formed as a V-tail comprising a first stabilizer and a second stabilizer. The first stabilizer is inclined between the horizontal and vertical directions and preferably includes a first control surface. The second stabilizer is inclined between the horizontal and vertical directions and preferably includes a second control surface. The second stabilizer is arranged symmetrically to the first stabilizer with respect to the vertical center plane. By such a V-tail, a vertical stabilizer and a rudder are omitted so that weight can be saved. The vertical stabilizer and the rudder are not necessarily required in the present centerline mounted double-engine configuration of the aircraft, because, in the case that one propulsion unit fails, no asymmetric thrust is caused by the remaining propulsion unit.

In particular, it is preferred that the second propulsion unit is mounted to a pylon. The pylon in turn is mounted to the aft section of the fuselage. The first and second stabilizers are mounted on opposite sides to the second propulsion unit, in particular to the second nacelle, to the pylon, or directly to the aft section of the fuselage. In such a way, the first and second stabilizers can be mounted to the fuselage directly or indirectly at different positions and with different structural paths. Preferably, the first nacelle is connected to the pylon by a support element, preferably formed as a rod or a beam. In such a way, the first nacelle can be additionally supported with respect to the pylon. In addition or as an alternative to the support element, the first nacelle might be supported by a further support element connecting the first nacelle to the aft section of the fuselage, preferably opposite the support element, preferably at a lower side of the fuselage.

According to an alternative preferred embodiment, the tail unit is formed as a conventional tail or a T-tail comprising a vertical stabilizer and a horizontal stabilizer. The vertical stabilizer preferably includes a rudder and the horizontal stabilizer preferably includes an elevator. The second propulsion unit is mounted to the vertical stabilizer, preferably with a distance to the fuselage. In such a way, also a conventional tail can be realized, if desired in particular cases. Preferably, the first nacelle is connected to the vertical stabilizer by a support element, preferably formed as a rod or a beam. The support element further supports the first nacelle with respect to the vertical stabilizer. In addition or as an alternative to the support element, the first nacelle might be supported by a further support element connecting the first nacelle to the aft section of the fuselage, preferably opposite the support element, preferably at a lower side of the fuselage.

BRIEF DESCRIPTION OF THE DRAWINGS

In the following, the present invention is described in more detail with respect to a drawing. The drawing shows in FIG. 1 is a perspective view of a first embodiment of the aircraft according to the present invention.

DETAILED DESCRIPTION OF THE PREFERRED EMBODIMENTS

Figure 1:
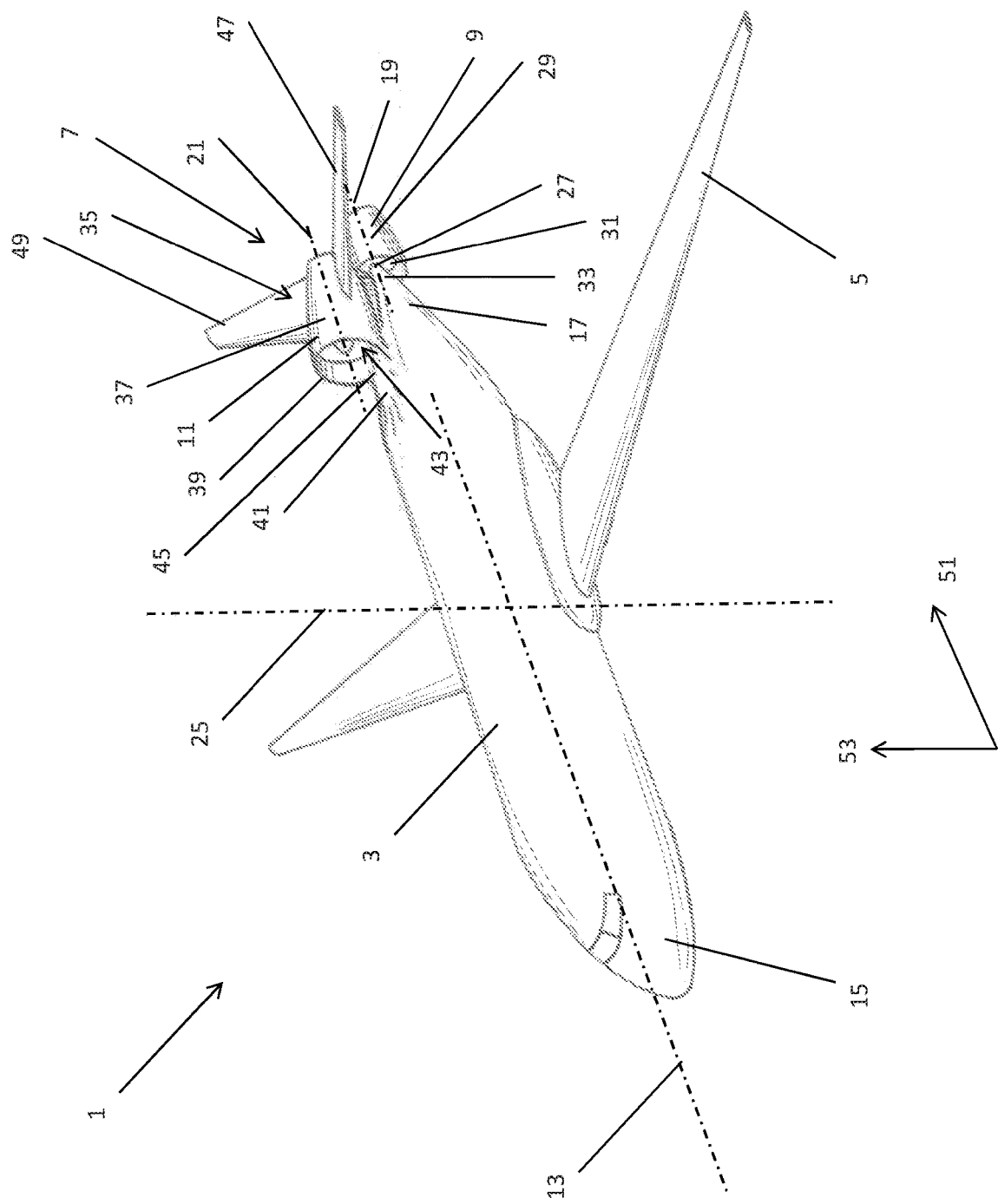
Figure 2:
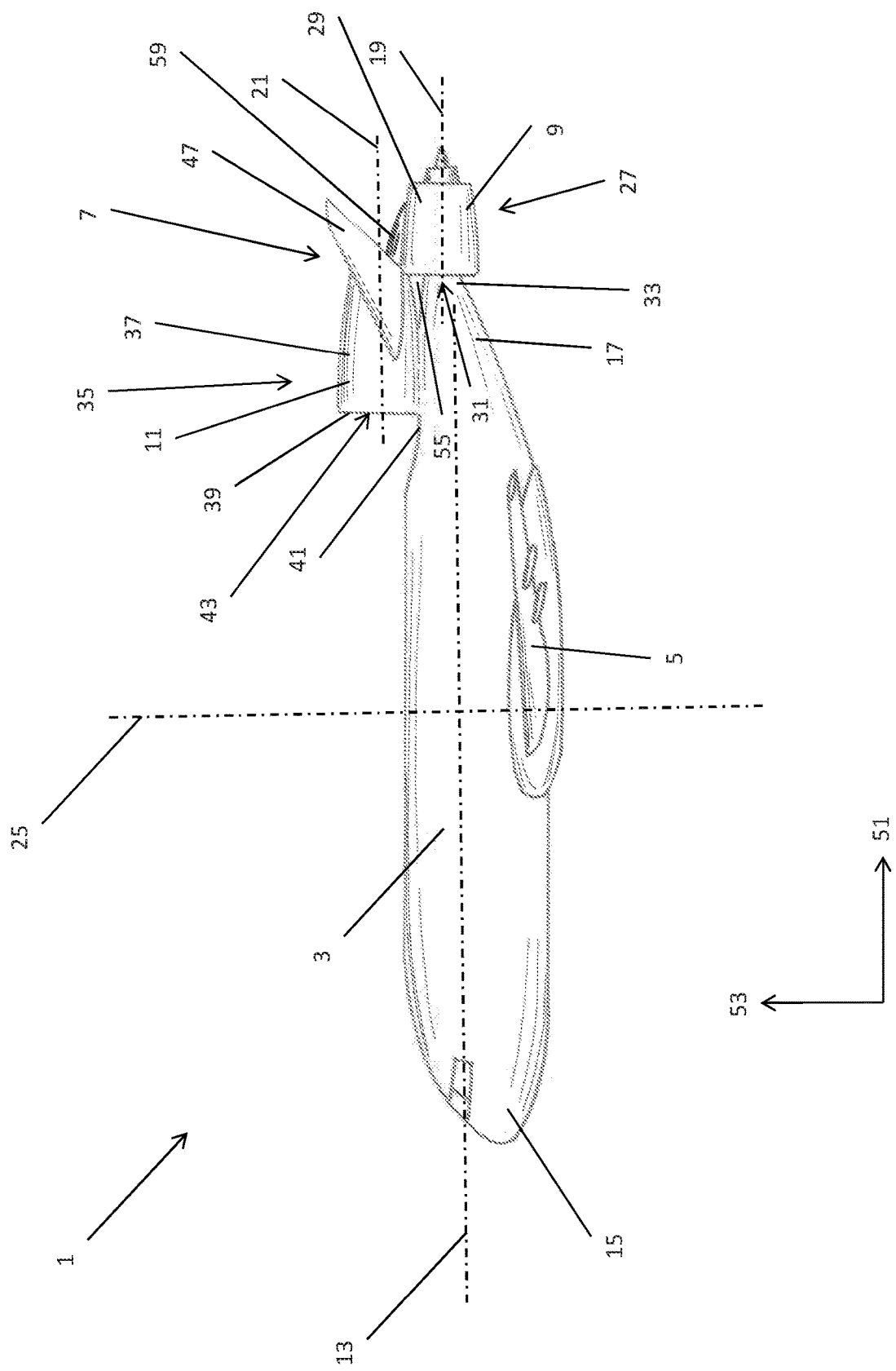
FIG. 2 is a side view of the embodiment shown in FIG. 1.
Figure 3:
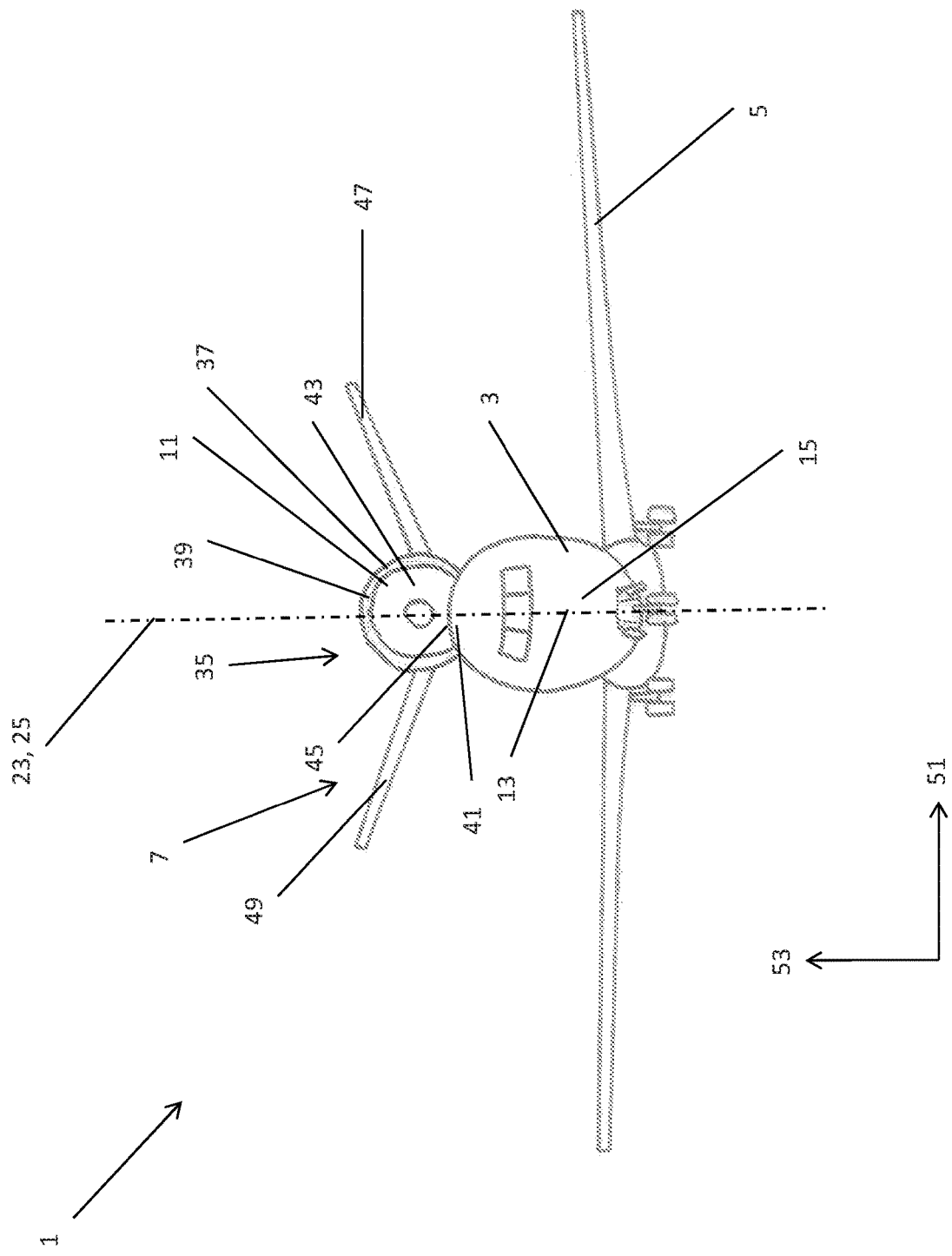
FIG. 3 is a front view of the embodiment shown in FIG. 1.

In FIGS. 1 to 3, a first embodiment of an aircraft 1 according to the present invention is shown. The aircraft 1 is a centerline mounted double-engine aircraft 1 comprising a fuselage 3, wings 5, a tail unit 7, a first propulsion unit 9 and a second propulsion unit 11. The fuselage 3 extends along a longitudinal axis 13 between a fore section 15 and an aft section 17. The wings 5 are mounted to the fuselage 3, and the tail unit 7 is mounted to the aft section 17 of the fuselage 3. The first propulsion unit 9 and the second propulsion unit 11 are mounted to the aft section 17 of the fuselage 3 in such a way that a first axis of rotation 19 of the first propulsion unit 9 and the second axis of rotation 21 of the second propulsion unit 11 extend in a vertical center plane 23 spanned by the longitudinal axis 13 and a yaw axis 25 of the aircraft 1. When viewed from above the aircraft 1, the vertical center plane 23 corresponds to a centerline, so that the propulsion units 9, 11 are referred to as "centerline mounted."

Both, the first propulsion unit 9 and the second propulsion unit 11, are arranged outside the fuselage 3 in such a way that they are staggered along the longitudinal axis 13, so that the first propulsion unit 9 does not overlap with the second propulsion unit 11 along the longitudinal axis 13. The aft section 17 of the fuselage 3 has an aft end 27 and narrows to the aft end 27. The first propulsion unit 9 comprises a first nacelle 29 and is mounted to the aft end 27 of the fuselage 3 in such a way that a first intake 31 is formed between the first nacelle 29 and an aft fuselage skin section 33 at the aft section 17 of the fuselage 3. The first intake 31 extends circumferentially over 360° around the aft section 17 of the fuselage 3 and is configured for Boundary Layer Ingestion over its entire circumference.

The second propulsion unit 11 is arranged at an upper side 35 of the aft section 17 of the fuselage and comprises a second nacelle 37. The second nacelle 37, at least in a lip portion 39, is interrupted along its circumference by an upper fuselage skin section 41 at the aft section 17 of the fuselage 3, such that a second intake 43 is formed between the lip portion 39 of the second nacelle 37 and the upper fuselage skin section 41. The circumferential section 45, in which the lip portion 39 of the second nacelle 37 is interrupted by the upper fuselage skin section 41, has an angular extension of between 30° and 60°. The second intake 43 is configured for Boundary Layer Ingestion in the region of the circumferential section 45, in which the lip portion 39 of the second nacelle 37 is interrupted by the upper fuselage skin section 41.

Figure 4:
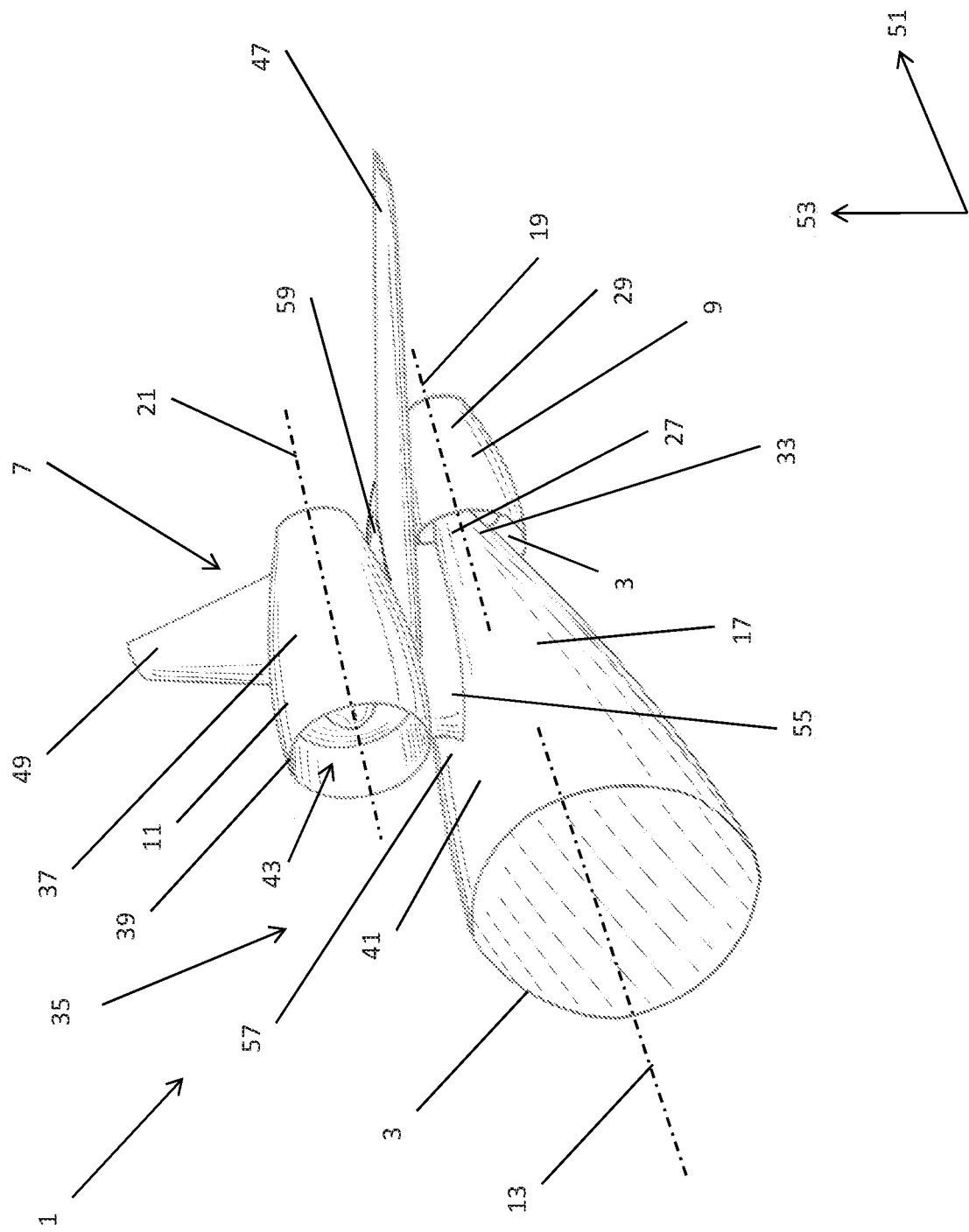
FIG. 4 is a perspective view of the aft section of a second embodiment of the aircraft according to the invention.

The tail unit 7 of the aircraft 1 is formed as a V-tail comprising a first stabilizer 47 and a second stabilizer 49, both stabilizers 47, 49 being inclined between the horizontal direction 51 and the vertical direction 53, wherein the second stabilizer 49 is arranged symmetrically to the first stabilizer 47 with respect to the vertical center plane 23. The second propulsion unit 11 is mounted to a pylon 55 that is mounted to the aft section 17 of the fuselage 3. In the embodiment shown in FIGS. 1 to 3, the first and second stabilizers 47, 49 are mounted to the second propulsion unit 11, specifically to the second nacelle 37. However, the first and second stabilizers 47, 49 might also be mounted to the pylon 55, as it is the case in the second embodiment illustrated in FIG. 4. Besides the first and second stabilizers 47, 49 being mounted to the pylon 55 instead of being mounted to the second nacelle 37, the second embodiment differs from the first embodiment by the second nacelle 37 being arranged in such a way that at least a lip portion 39 of the second nacelle 37 is spaced apart from an upper fuselage skin section 41 at the aft section 17 of the fuselage 3, so that a gap 57 is formed between the lip portion 39 of the second nacelle 37 and the upper fuselage skin section 41, and no Boundary Layer Ingestion is enabled for the second propulsion unit 11. In the first embodiment as well as in the second embodiment, the first nacelle 29 is connected to the pylon 55 by a support element 59 additionally supporting the first nacelle 29 with respect to the pylon 55. In addition or as an alternative to the support element 59, the first nacelle 29 might be supported by a further support element (not shown) connecting the first nacelle 29 to the aft section 17 of the fuselage 3, preferably opposite the support element 59 at a lower side of the fuselage 3.

Figure 5:
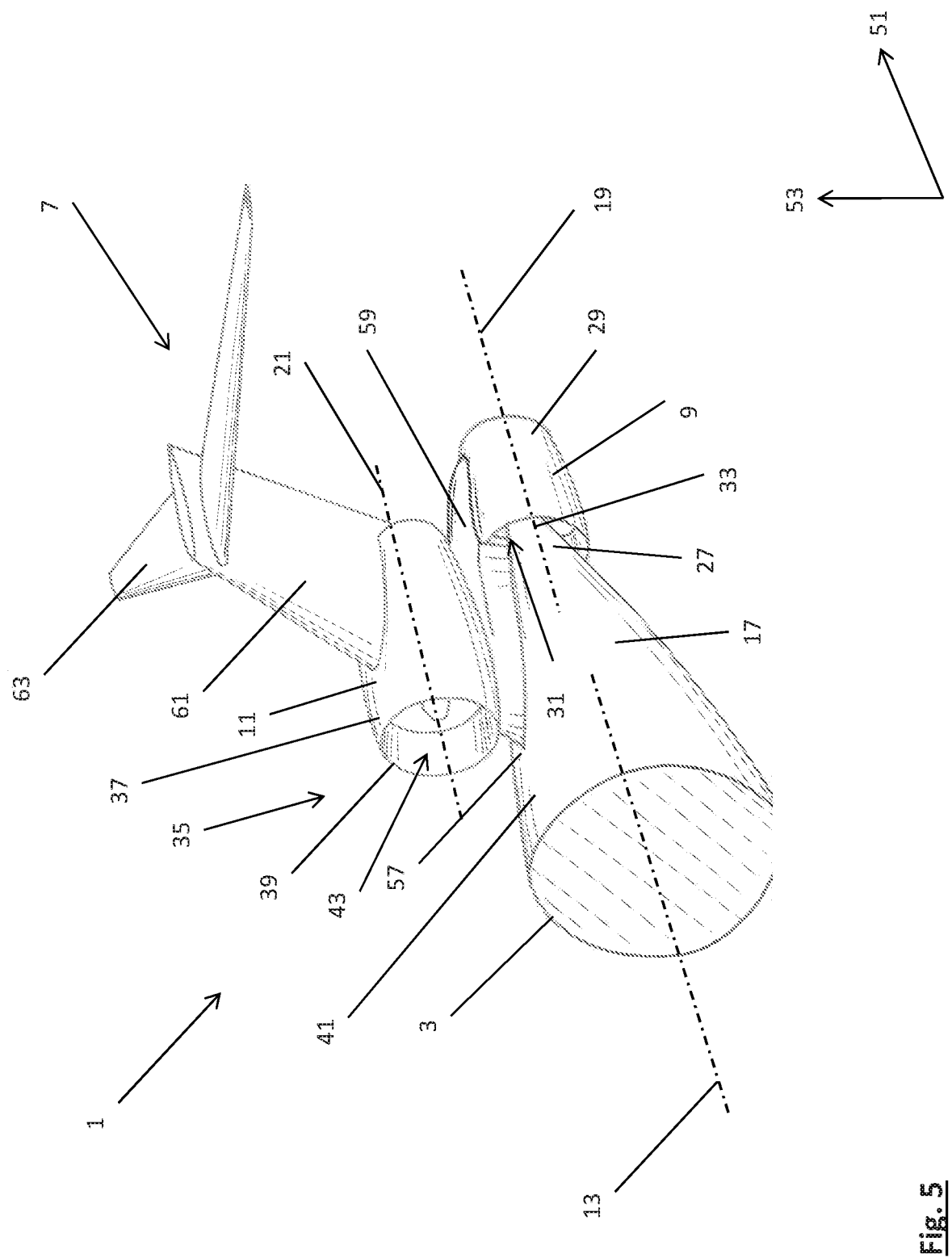
FIG. 5 is a perspective view of the aft section of a third embodiment of the aircraft according to the present invention.

In FIG. 5, a third embodiment of the aircraft 1 according to the invention is illustrated, which differs from the first and second embodiments by the tail unit 7 being formed as a T-tail comprising a vertical stabilizer 61 and a horizontal stabilizer 63. The second propulsion unit 11 is mounted to the vertical stabilizer 61 with a distance to the upper fuselage skin section 41 at the aft section 17 of the fuselage 3, so that a gap 57 is formed between the lip portion 39 of the second nacelle 37 and the upper fuselage skin section 41, and no Boundary Layer Ingestion is enabled for the second propulsion unit 11. Also, the first nacelle 29 is connected to the vertical stabilizer 61 by a support element 59 additionally supporting the first nacelle 29 to the vertical stabilizer 61.

By the aircraft 1 according to the present invention, i.e., by a centerline mounted double-engine aircraft 1 with both engines 9, 11 arranged outside the fuselage 3, a plurality of goals are achieved. First, no asymmetric thrust occurs in the case of failure of one propulsion unit 9, 11. As a result, no vertical tail plane is required thereby enabling a V-tail saving considerable weight, or the vertical tail plane can be dimensioned smaller thereby also saving weight. Second, the propulsion units 9, 11 are easy to check, maintain, repair, exchange, so that manufacture and maintenance are simplified and modularity is enabled. Third, in the case of uncontained engine rotor failure, a minimum structural damage is caused to the fuselage 3. Fourth, Boundary Layer Ingestion is enabled at both propulsion units 9, 11.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft comprising:
 a fuselage extending along a longitudinal axis between a fore section and an aft section,
 wings mounted to the fuselage,
 a tail unit mounted to the aft section of the fuselage, and
 a first propulsion unit and a second propulsion unit, both mounted to the aft section of the fuselage such that a first axis of rotation of the first propulsion unit and a second axis of rotation of the second propulsion unit both extend in a vertical center plane spanned by the longitudinal axis and a yaw axis,
 at least one of the first propulsion unit or the second propulsion unit being arranged outside the fuselage,
 wherein the first propulsion unit and the second propulsion unit are staggered along the longitudinal axis, such that the first propulsion unit does not overlap with the second propulsion unit along the longitudinal axis.

2. The aircraft according to claim 1, wherein the aft section of the fuselage has an aft end, and wherein the first propulsion unit is mounted to the aft end of the fuselage.

3. The aircraft according to claim 2, wherein the first propulsion unit comprises a first nacelle, wherein the aft section of the fuselage narrows to the aft end, and wherein the first propulsion unit is mounted to the aft end of the fuselage in such a way that a first intake is formed between the first nacelle and an aft fuselage skin section at the aft section of the fuselage.

4. The aircraft according to claim 3, wherein the first intake extends circumferentially around the aft section of the fuselage.

5. The aircraft according to claim 3, wherein the first propulsion unit is configured for boundary layer ingestion.

6. The aircraft according to claim 1, wherein the first propulsion unit is arranged in such a way that the first axis of rotation is aligned with the longitudinal axis.

7. The aircraft according to claim 1, wherein the second propulsion unit is arranged at an upper side of the aft section of the fuselage.

8. The aircraft according to claim 7, wherein the second propulsion unit comprises a second nacelle, wherein the second nacelle, at least in a lip portion, is interrupted along its circumference by an upper fuselage skin section at the aft section of the fuselage, such that a second intake is formed between the second nacelle and the upper fuselage skin section.

9. The aircraft according to claim 8, wherein the circumferential section in which the lip portion of the second nacelle is interrupted by the upper fuselage skin section has an angular extension of between 5° and 180.

10. The aircraft according to claim 8, wherein the circumferential section in which the lip portion of the second nacelle is interrupted by the upper fuselage skin section has an angular extension of between 20° and 90°.

11. The aircraft according to claim 8, wherein the circumferential section in which the lip portion of the second nacelle is interrupted by the upper fuselage skin section has an angular extension of between 30° and 60°.

12. The aircraft according to claim 8, wherein the second propulsion unit is configured for boundary layer ingestion at least in the region of the circumferential section in which the lip portion of the second nacelle is interrupted by the upper fuselage skin section.

13. The aircraft according to claim 7, wherein the second propulsion unit comprises a second nacelle, and wherein the second nacelle is arranged in such a way that at least a lip portion of the second nacelle is spaced apart from an upper fuselage skin section at the aft section of the fuselage.

14. The aircraft according to claim 1, wherein the tail unit is formed as a V-tail comprising a first stabilizer inclined between the horizontal and vertical directions, and comprising a second stabilizer inclined between the horizontal and vertical directions and arranged symmetrically to the first stabilizer.

15. The aircraft according to claim 14, wherein the second propulsion unit is mounted to a pylon that is mounted to the aft section of the fuselage, and wherein the first and second stabilizers are mounted to the second propulsion unit, to the pylon, or directly to the aft section of the fuselage.

16. The aircraft according to claim 1, wherein the tail unit is formed as a conventional tail comprising a vertical stabilizer and a horizontal stabilizer, wherein the second propulsion unit is mounted to the vertical stabilizer.

17. An aircraft comprising:
a fuselage extending along a longitudinal axis between a fore section and an aft section,
wings mounted to the fuselage,
a tail unit mounted to the aft section of the fuselage, and
a first propulsion unit and a second propulsion unit, both mounted to the aft section of the fuselage such that a first axis of rotation of the first propulsion unit and a second axis of rotation of the second propulsion unit both extend in a vertical center plane spanned by the longitudinal axis and a yaw axis,
at least one of the first propulsion unit or the second propulsion unit being arranged outside the fuselage,
wherein the aft section of the fuselage has an aft end, and wherein the first propulsion unit is mounted to the aft end of the fuselage,
wherein the first propulsion unit comprises a first nacelle, wherein the aft section of the fuselage narrows to the aft end, and wherein the first propulsion unit is mounted to the aft end of the fuselage in such a way that a first intake is formed between the first nacelle and an aft fuselage skin section at the aft section of the fuselage,
wherein the first intake extends circumferentially around the aft section of the fuselage.

18. An aircraft comprising:
a fuselage extending along a longitudinal axis between a fore section and an aft section,
wings mounted to the fuselage,
a tail unit mounted to the aft section of the fuselage, and
a first propulsion unit and a second propulsion unit, both mounted to the aft section of the fuselage such that a first axis of rotation of the first propulsion unit and a second axis of rotation of the second propulsion unit both extend in a vertical center plane spanned by the longitudinal axis and a yaw axis,
at least one of the first propulsion unit or the second propulsion unit being arranged outside the fuselage,
wherein the second propulsion unit is arranged at an upper side of the aft section of the fuselage,
wherein the second propulsion unit comprises a second nacelle, wherein the second nacelle, at least in a lip portion, is interrupted along its circumference by an upper fuselage skin section at the aft section of the fuselage, such that a second intake is formed between the second nacelle and the upper fuselage skin section.

19. The aircraft according to claim 18, wherein the circumferential section in which the lip portion of the second nacelle is interrupted by the upper fuselage skin section has an angular extension of between 5° and 180.

20. The aircraft according to claim 18, wherein the circumferential section in which the lip portion of the second nacelle is interrupted by the upper fuselage skin section has an angular extension of between 20° and 90°.

21. The aircraft according to claim 18, wherein the circumferential section in which the lip portion of the second nacelle is interrupted by the upper fuselage skin section has an angular extension of between 30° and 60°.

22. The aircraft according to claim 18, wherein the second propulsion unit is configured for boundary layer ingestion at least in the region of the circumferential section in which the lip portion of the second nacelle is interrupted by the upper fuselage skin section.

* * * * *